(12) United States Patent
Agrawal et al.

(10) Patent No.: US 9,243,162 B1
(45) Date of Patent: Jan. 26, 2016

(54) WAX COATING COMPOSITION FOR CELLULOSIC SURFACES

(71) Applicants: Sarvesh K. Agrawal, Woolwich Township, NJ (US); Larry E. Hoch, Yardley, PA (US); Todd T. Nadasdi, Philadelphia, PA (US)

(72) Inventors: Sarvesh K. Agrawal, Woolwich Township, NJ (US); Larry E. Hoch, Yardley, PA (US); Todd T. Nadasdi, Philadelphia, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/470,990

(22) Filed: Aug. 28, 2014

(51) Int. Cl.
| | |
|---|---|
| C09D 191/06 | (2006.01) |
| C09D 11/00 | (2014.01) |
| C08L 91/06 | (2006.01) |
| C09D 151/06 | (2006.01) |
| C08K 5/01 | (2006.01) |
| C08K 3/34 | (2006.01) |
| C09D 123/06 | (2006.01) |
| C09D 123/08 | (2006.01) |

(52) U.S. Cl.
CPC ............ *C09D 151/06* (2013.01); *C08K 3/346* (2013.01); *C08K 5/01* (2013.01); *C09D 123/06* (2013.01); *C09D 123/0853* (2013.01)

(58) Field of Classification Search
CPC ............ C09D 151/06; C09D 123/06; C09D 123/0853; C08K 5/01; C08K 3/346
See application file for complete search history.

(56) References Cited

U.S. PATENT DOCUMENTS

| | | |
|---|---|---|
| 2,877,196 A | 3/1959 | Reding |
| 3,189,573 A | 6/1965 | Oken |
| 3,428,591 A | 2/1969 | Lewis |
| 3,440,194 A | 4/1969 | Taranto et al. |
| 3,629,171 A | 12/1971 | Kremer et al. |
| 3,647,733 A | 3/1972 | McDonald |
| 4,965,305 A | 10/1990 | Jones |
| 7,135,508 B2 | 11/2006 | Chaiko et al. |
| 7,915,183 B2 | 3/2011 | Wuu |
| 2003/0187120 A1 | 10/2003 | Chaiko et al. |
| 2004/0244931 A1 | 12/2004 | Shoshany et al. |
| 2011/0165207 A1* | 7/2011 | Nolte ................ B82Y 30/00 424/401 |
| 2011/0172332 A1 | 7/2011 | Lins et al. |
| 2011/0177142 A1* | 7/2011 | Nolte ................... C08K 3/00 424/401 |
| 2011/0195099 A1* | 8/2011 | Nolte ................ C09D 7/1208 424/401 |

FOREIGN PATENT DOCUMENTS

| | | |
|---|---|---|
| WO | 2009/012292 A1 | 1/2009 |
| WO | 2009/129909 A1 | 10/2009 |

OTHER PUBLICATIONS

Wang, Jinfeng et al., "Brittle-ductile transitons and the toughening mechanism in paraffin/organo-clay nanocomposites," Materials Science and Engineering A 467, 2007, pp. 172-180.
Botros, Maged, "Development of New Generation Coupling Agents for Wood-Plastic Composites," Intertech Conference, The Global Outlook for Natural and Wood Fiber Composites, 2003, New Orleans, LA.
Wang, Jinfeng et al., "Dynamic Rheolocical Study of Paraffin Wax and its Organoclay Nanocomposites," Journal of Applied Polymer Science, 2008, vol. 108, pp. 2564-2570.
Pu, Gang et al., "Properties of Paraffin Wax/Montmorillonite Nanocomposite Coatings," NSTI Nanotech 2007, Nanotechnology Conference and Trade Show, Santa Clara, California.
Pu, Gang et al., "Stabilizing contact angle hysteresis of paraffin wax surfaces with nanoclay," Colloid and Polymer Science, 2013, vol. 291, issue 2, pp. 383-389.
Wang, Jinfeng et al., "Significant and Concurrent Enhancement of Stiffness, Strength, and Toughness for Paraffin Wax Through Organoclay Addition," Advanced Materials, 2006, vol. 18, issue 12, pp. 1585-1588.
The International Search Report and Written Opinion of PCT/US2015/043606 dated Oct. 12, 2015.

\* cited by examiner

*Primary Examiner* — Robert Harlan
(74) *Attorney, Agent, or Firm* — Robert A. Migliorini

(57) ABSTRACT

Wax compositions are provided with improved properties for various applications, such as coating of corrugated cardboard or other cellulosic paper materials. In addition to wax, the compositions include a polymer with a hydrophobic backbone that is "functionalized" to incorporate a limited percentage of hydrophilic and/or polar groups. The compositions can optionally also include inorganic nanoparticles such as clay particles.

20 Claims, 4 Drawing Sheets

WAX COATING COMPOSITION FOR CELLULOSIC SURFACES

FIELD

Systems and methods are provided for forming a wax coating composition.

BACKGROUND

Coated paper products, such as wax-coated corrugated cardboard boxes, are used in a variety of applications. For example, wax-coated corrugated cardboard can be used to make poultry boxes and other types of boxes that are used to carry and transport frozen and ice packed seafood, poultry, fruits and vegetables. A wax coating on these boxes not only provides rigidity and strength to these boxes but also water proofing to the boxes when they are exposed to wet and frozen food products during transportation that ultimately protects the mechanical integrity of the boxes during transportation.

U.S. Pat. No. 7,135,508 describes organoclay/wax nanocomposites for use in forming coatings and films. The nanocomposites contain at least 1 wt % clay. Mixtures containing both wax and an additional polymer are also described for "high" organoclay concentrations. A "high" concentration of organoclay does not appear to be explicitly defined, but an example provides an organoclay content of about 22 wt % for use in a 50/50 mixture of wax and polyethylene.

U.S. Pat. No. 7,915,183 describes a dispersion of an inorganic hydrophobic mineral filler, such as talc, in wax at compositions ranging from about 5 wt % to about 90 wt % mineral filler in wax.

SUMMARY

In an aspect, a wax composition is provided. The wax composition includes a wax having a base wax viscosity of 10 cSt or less at 100° C.; and about 0.5 to about 5 wt % of functionalized polymer, based on the weight of the wax composition, the functionalized polymer comprising about 2 wt % to about 6 wt % of polar functional groups based on the weight of the functionalized polymer, wherein a viscosity of the wax composition is about 12 cSt or less at 100° C.

In some aspects, the polar functional groups of the wax composition can include maleic anhydrides, oxazolines, epoxides, glycidyl methacrylates, carboxylic acids, ethylene acrylic acids, carboxylic acid derivatives, vinyl alkanoates, ethylene vinyl acetates, acid anhydrides, ionic compounds, amines, or combinations thereof. In other aspects, the polar functional groups of the wax composition can include maleic anhydrides, glycidyl methacrylates, ethylene acrylic acids, vinyl alkanoates, ethylene vinyl acetates, or combinations thereof. In still other aspects, the polar functional groups of the wax composition can include oxazolines, epoxides, glycidyl methacrylates, carboxylic acids, ethylene acrylic acids, carboxylic acid derivatives, vinyl alkanoates, ethylene vinyl acetates, acid anhydrides, or combinations thereof.

In another aspect, a wax composition is provided. The wax composition includes a wax having a base wax viscosity of 10 cSt or less at 100° C.; about 0.001 wt % to about 0.5 wt % of inorganic nanoparticles, based on the weight of the wax composition; and about 0.5 to about 5 wt % of functionalized polymer, based on the weight of the wax composition, the functionalized polymer comprising about 0.4 wt % to about 6 wt % of polar functional groups based on the weight of the functionalized polymer, wherein a viscosity of the wax composition is about 12 cSt or less at 100° C. Optionally, the inorganic nanoparticles can comprise phyllosilicate clay particles. Optionally, the inorganic nanoparticles can comprise surface modified nanoparticles, the surface modified nanoparticles having increased hydrophobic character relative to the inorganic nanoparticles prior to surface modification.

In still another aspect, a wax composition is provided. The wax composition includes a wax having a base wax viscosity of 10 cSt or less at 100° C.; and about 0.5 to about 5 wt % of functionalized polymer, based on the weight of the wax composition, the functionalized polymer comprising about 0.4 wt % to about 6 wt % of polar functional groups based on the weight of the functionalized polymer, a viscosity of the wax composition at 100° C. being less than about 60% greater than the base wax viscosity at 100° C., wherein the polar functional groups comprise, oxazolines, epoxides, glycidyl methacrylates, carboxylic acids, ethylene acrylic acids, vinyl alkanoates, ethylene vinyl acetates, ionic compounds, amines, or combinations thereof.

DETAILED DESCRIPTION

Figure 1:
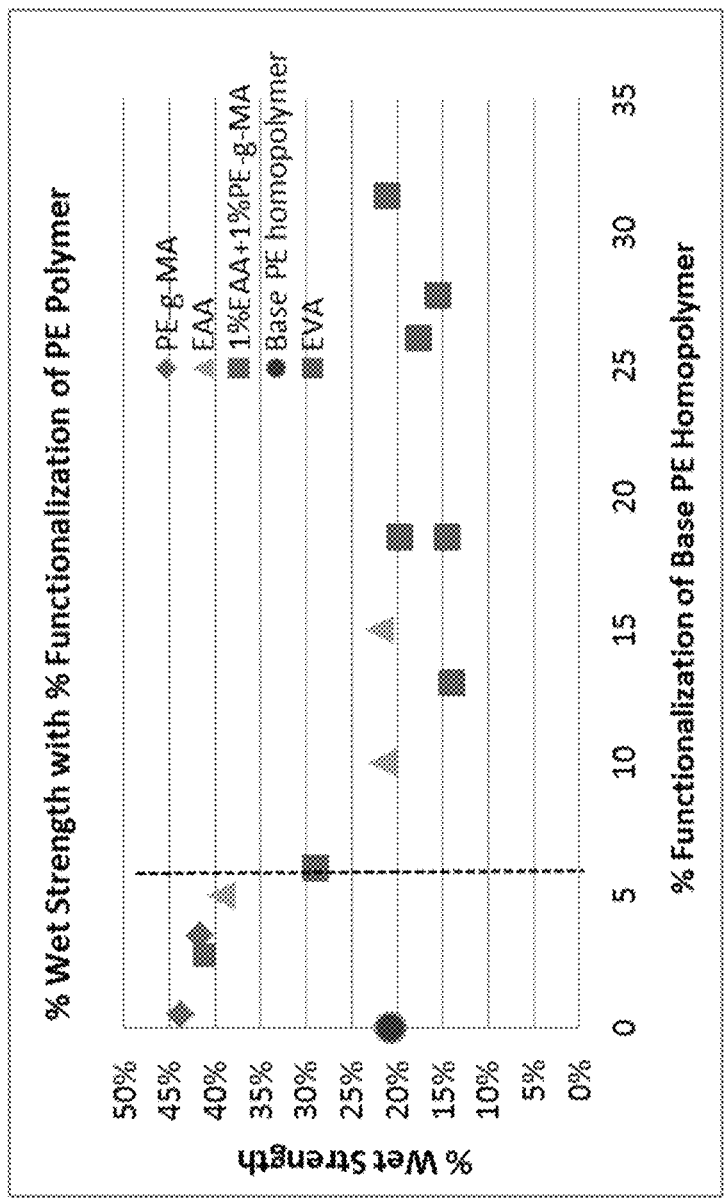
FIG. 1 shows the wet strength for cellulosic samples coated with various wax compositions.

All numerical values within the detailed description and the claims herein are modified by "about" or "approximately" the indicated value, and take into account experimental error and variations that would be expected by a person having ordinary skill in the art.

Overview

In various aspects, wax compositions are provided with improved properties for various applications, such as coating of corrugated cardboard or other cellulosic paper materials. In addition to wax, the compositions include a polymer with a hydrophobic backbone that is "functionalized" to incorporate a limited percentage of hydrophilic groups. The compositions can optionally also include inorganic nanoparticles, such as clay particles. It has been found that substantial improvements in wax properties can be achieved by using unexpectedly small amounts of the functionalized polymer and the optional inorganic (clay) nanoparticles. For the functionalized polymer, the amount of polymer added to the wax composition can be less than about 5 wt % of the composition. Additionally, the amount of the functionalization of the polymer can be limited, so that the polar functional groups grafted or otherwise incorporated into the polymer to "functionalize" the polymer represent about 0.4 wt % to about 6 wt % of the weight of the functionalized polymer. For the optional inorganic particles, the amount of particles added to the wax composition can also be a reduced or minimized amount, such as about 0.001 wt % to about 0.5 wt % of the wax composition.

Incorporation of polymers and/or particles into a wax composition to alter the properties of a wax has previously been performed. For example, coating compositions to provide a moisture barrier and/or an oil and grease barrier are commonly used on paper products, such as cardboard containers for transport of food products. Traditionally, wax coatings modified with polymers have found a significant use in this application. However, with an increase in price of such wax coatings over the years, there is a need for coatings that can provide improved water barrier protection, which can thereby allow the manufacturer to use a reduced or minimized weight of coating on a cardboard surface (or other cellulosic surface) while retaining a desired level of performance as a water barrier. Use of a reduced or minimized amount of wax can in turn provide cost savings to the customer and manufacturer.

A wax coating for a corrugated cardboard containing can also provide additional strength for the container. For commercial transport of food, it is desirable to use corrugated containers saturated with wax as rigid-when-wet corrugated container for packaging fresh fruits, vegetables, fresh iced poultry and other products. Such containers are typically coated with about 40-45 wt % wax compared to the weight of the unwaxed box. Unfortunately, the stacking strength of such waxed boxes can deteriorate rapidly under moist or wet conditions.

One option for improving the performance of wax coated containers under moist/wet conditions is to incorporate additives into the wax. While wax by itself provides strength and water barrier performance to the corrugated board, a polymer added to base wax can enhance the water barrier performance of the wax as well as enhancing the wet strength of a resulting coated product. The water barrier performance and strength can further be enhanced by addition of nanoparticles into the wax composition.

In conventional methods for incorporating polymers or nanoparticles into a wax, the challenge has been to add a sufficiently high amount of polymer and/or a sufficiently high amount of nanoparticles to a wax in order to achieve a desired property modification without harming other features of the wax. For polymer addition, incorporation of large amounts of polymer into a wax composition is generally not difficult, as waxes and polymers both typically have substantial amounts of hydrophobic character. This can allow many waxes and polymers to be miscible in various amounts. However, addition of substantial amounts of polymer to a wax composition can create difficulties. In addition to increasing the cost of a wax composition, polymer additives for wax compositions can increase the viscosity of the composition. An increased viscosity can lead to difficulties in applying a desired amount of wax to a surface, such as a cardboard surface. When attempting to apply the wax composition to a cardboard surface or a surface of another cellulosic material, the increased viscosity can create difficulties in creating a coating that is both thin and sufficiently continuous to provide improved water resistance to the underlying material. For example, wax is typically applied to cardboard for packing boxes by applying the wax to a substantially vertically-oriented surface and allowing gravity to pull the wax across the surface of the cardboard. At higher viscosities, the coating thickness required to maintain a substantially continuous coating is greater, thus requiring an increased amount of the wax to coat a given surface. Higher viscosities can also require higher processing temperatures during application of the wax.

Addition of nanoparticles to a wax to form a nanoparticle/wax composition can present a different set of problems. Clay nanoparticles and/or other types of particles are typically not "miscible" with waxes. As a result, instead of dispersing throughout a wax (or the wax dispersing in the nanoparticles), the nanoparticles and wax can have a tendency to aggregate. This can lead to a composition with distinct phases having different properties, as opposed to a (relatively) uniform wax composition having a desired set of properties. Modification of surfaces of the nanoparticles with hydrophobic polymers can improve the miscibility of nanoparticles with a wax to form a composition.

It has been discovered that addition of small or minimized amounts of polymer and/or nanoparticles can result in substantial improvements in the properties of a wax composition. Instead of adding comparable amounts of wax and polymer according to a conventional method, the amount of polymer added to a wax can be limited to a few percent of the composition. Similarly, it has been determined that reduced or minimized amounts of nanoparticles (fractions of a weight percent) can be used to achieve a desired modification of the properties of a wax composition.

The polymer added to a wax can correspond to a modified or functionalized polymer, such as a polymer comprised of a hydrophobic backbone with hydrophilic functionality grafted to the backbone and/or incorporated into the polymer during polymerization. Such modification of a polymer can provide further benefits when incorporating the polymer into a wax composition. It has further been determined that a reduced or minimized amount of modification to a polymer can be used to achieve a desired result.

With regard to the clay particles, use of the reduced or minimized amount of particles as described herein can also be beneficial for maintaining a lower viscosity for the resulting composition. Additionally, the amounts of clay particles described herein can reduce or minimize difficulties with incorporating the clay into the composition. At higher amounts of clay particles, in addition to providing reduced benefits for coating properties, the clay particles may not be sufficiently compatible with the wax/polymer portion of the composition. This can lead to problems such as localized phase separation behavior, leading to further potential degradation of coating properties.

In this discussion, the "percent wet strength" or "wet strength" of a coated cellulosic sample refers to the compressive force required to rupture a sample when the sample is waxed and wetted in water, in comparison to a dry unwaxed sample of the same cellulosic material. The wet strength is reported as a percentage, based on the percentage of the strength of the unwaxed sample that is retained when the sample is waxed and wetted.

Waxes and Polymer Additives for Forming Functionalized Polymers

In various aspects, the composition can include a wax and a polymer that has been functionalized for improving the properties of the composition. The wax in the composition can be a mineral wax such as paraffin wax or microwax (microcrystalline wax); vegetable or animal derived bio-wax; synthetic wax such as Fischer-Tropsch wax or polyethylene wax; semi-crystalline waxes; or combinations of two or more waxes and/or two or more types of waxes. In some aspects, the wax can include at least about 50 wt % of a paraffin wax, or at least about 60 wt %, or at least about 70 wt %. The kinematic viscosity of the wax, prior to combination with a polymer additive and/or nanoparticles, can be about 10 cSt or less at 100° C., or about 8 cSt or less, or about 6 cSt or less. Preferably, the viscosity of the wax at 100° C. can be at least about 3.0 cSt prior to incorporation of polymer additive and/or nanoparticles.

Examples of polymer waxes can include polyethylene waxes, polypropylene waxes, Fischer-Tropsch waxes, polymerized alpha-olefins waxes, polyethylene-block-polyethylene glycol waxes, and polyethylene mono-alcohol waxes. Microcrystalline waxes typically comprise isoparaffinic, naphthenic and n-alkane saturated hydrocarbons. Microcrystalline waxes can have a melt point from about 54° C. to about 99° C. and a melt viscosity at 99° C. of about 8 to about 25 centipoise. Microcrystalline waxes can have an oil content from about 0.5 wt % to about 12 wt %. Paraffin waxes can include from about 30 wt % to about 100 wt % n-alkane straight chain saturated $C_{20}$- to $C_{60}$-hydrocarbons. The paraffin waxes can have a melt point typically from about 35° C. to about 85° C., a melt viscosity at 99° C. commonly of about 2 centipoise to about 15 centipoise, and typically contain less than about 25 wt % oil. Examples of semi-crystalline waxes include without limitation, polyethylene-block-polyethylene glycol waxes, polyethylene monoalcohol waxes, and mixtures thereof. Petroleum waxes are yet another type of wax. Petroleum waxes comprise a mixture of paraffin and microcrystalline waxes.

A polymer additive can be incorporated into the wax composition. The polymer additive can have a hydrophobic backbone for good miscibility with the wax. The polymer additive can also be functionalized with polar functional groups, to improve the interaction of the wax composition with hydrophilic surfaces, such as paper surfaces or the surfaces of clay nanoparticles. The backbone of the polymer additive can be any convenient type of polymer that has a primarily hydrophobic character, such as polyethylene. A polymer backbone having a primarily hydrophobic character is defined as a polymer backbone that, prior to functionalization, is soluble in paraffin wax. Suitable polymer backbones can include homopolymers and/or polymers having multiple types of "mer" units. Examples of suitable polymer backbones can include polypropylene, polystyrene, polyethylene. Introduction of the polar groups into a polymer with a primarily hydrophobic backbone can improve the bonding between the polymer and a cellulosic surface, such as a cardboard surface. Without being bound by any particular theory, it is believed that the additional polar groups can improve the interaction between the functionalized polymer and hydroxyl groups present at the surface of the cellulosic material. Examples of such functionalized polymers that can bond with a polar cellulosic surface include but are not limited to maleic anhydride functionalized polymers, terpolymers and blends, oxazoline and epoxide modified compounds such as glycidyl methacrylate functionalized polymers, carboxylic acid modified polymers such as ethylene acrylic acid, carboxylic acid derivative modified polymers, vinyl alkanoate modified polymers such as ethylene vinyl acetate, other acid anhydride modified polymers, ionic compound modified polymers, amine modified compounds and various combination or blends of the same.

The amount of polymer in the coating (wax) composition can be between about 0.5 wt % to about 5 wt %. For example, the amount of polymer in the wax composition can be about 0.5 wt % to about 1.5 wt %, or about 0.5 wt % to about 2.0 wt %, or about 0.5 wt % to about 3.0 wt %, or about 1.0 wt % to about 3.0 wt %, or about 0.5 wt % to about 4.0 wt %, or about 1.0 wt % to about 4.0 wt %. It has been determined that the inclusion of the polymer additive can make the wax coating harder which in turn enhances the rigidity and load bearing strength of the coated boards and boxes.

It has been discovered that modifying the polymer additive with a hydrophilic (polar) functional group resulted in improved water barrier performance. However, it was surprisingly discovered that for the reduced amounts of polymer additive in a wax composition described above, the beneficial effect of the functional group modification was only seen when the amount of functional group modification of the polymer was kept between about 0.4 wt % to about 6% of the total polymer. Outside of this range of functional group modification of the polymer, the performance of the wax blend was similar to the performance of a wax blend containing an equivalent amount of unfunctionalized polymer component as an additive. For example, the amount of functional group modification of the polymer added to the wax composition, relative to the weight of the polymer, can be about 0.4 wt % to about 4 wt %, or about 0.4 wt % to about 5 wt %, or about 0.4 wt % to about 6 wt %, or about 1.0 wt % to about 4 wt %, or about 1.0 wt % to about 5 wt %, or about 1.0 wt % to about 6 wt %, or about 1.5 wt %/o to about 4 wt %, or about 1.5 wt % to about 5 wt %, or about 1.5 wt % to about 6 wt %, or about 2.0 wt % to about 4 wt %, or about 2.0 wt % to about 5 wt %, or about 2.0 wt % to about 6 wt %. Additionally or alternately, the amount of hydrophobic polymer backbone in the polymer additive can be at least about 94 wt % of the polymer additive, or at least about 95 wt %, or at least about 96 wt %. The functional group can be added by grafting the functional group to the polymer backbone, by incorporating monomers with functional groups to form a copolymer during polymer synthesis, or by any other convenient method.

In some aspects, the wax composition can consist essentially of one or more waxes, one or more polymer additives (functionalized polymers), and optionally one or more types of nanoparticles. In such aspects, the wax composition does not include other types of polymer products different from the functionalized polymers described herein. For example, a wax composition that consists essentially of waxes, functionalized polymers, and optionally nanoparticles can exclude the presence of compounds such as natural or synthetic rubber compounds.

In various aspects, the viscosity of a wax composition after incorporation of a functionalized polymer and/or nanoparticles can be sufficiently low to provide desirable properties when applying the wax composition to a paper (cardboard) surface. One way of characterizing the viscosity of a wax composition after addition of polymer and/or nanoparticles can be on a relative basis. In such aspects, the viscosity of the wax at 100° C. after addition of polymer, or after the addition of both polymer and nanoparticles, can be greater than the viscosity of the wax at 100° C. prior to addition of polymer (and optionally nanoparticles) by about 60% or less, or about 50% or less, or about 40% or less, or about 33% or less. For example, if a wax has a viscosity at 100° C. of 5 mm$^2$/s, the viscosity after addition of polymer (or both polymer and nanoparticles) can be about 8 mm$^2$/s or less in order to satisfy the requirement of the final viscosity being greater than the wax viscosity by 60% or less.

Additionally or alternately, another option for characterizing a wax composition including a functionalized polymer (or including both polymer and nanoparticles) is based on the viscosity of the final composition. In this type of aspect, the viscosity of the wax composition at 100° C. can be about 12 cSt or less, or 10 cSt or less, or 8 cSt or less, or about 7 cSt or less, or about 6 cSt or less, or about 5 cSt or less. Typically the viscosity of the wax composition can be at least about 3 cSt, or at least about 4 cSt.

Incorporation of Inorganic Particles

In some aspects, the properties of a wax can be further enhanced by incorporating or dispersing inorganic particles in the melted wax/polymer. Particles that are sufficiently small, such as clay nanoparticles, can disperse or solubilize within a wax composition so that the nanoparticles do not represent a separate phase from the wax. Incorporation of inorganic particles into a wax matrix can enhance various properties of wax. However, the ability to effectively disperse or incorporate inorganic particles can be dependent on the compatibility of the particles with the wax. For wax compositions, the hydrophobic nature of the wax can make it difficult for the inorganic particles to disperse within the wax.

In some aspects, a superior coating composition for cellulosic substrates composed predominantly of wax can be achieved through incorporation of small amounts of platelike inorganic nanoparticles into the wax composition. The platelike inorganic nanoparticles can be modified on the surface to render the nanoparticles partially hydrophobic, but not modified on the edge so that the nanoparticles have a hydrophilic character on the edge. Such nanoparticles can be incorporated into a wax composition together with small amounts of a compatibilizing polymeric additive, such as the functionalized polymer additives described above which correspond to a relatively hydrophobic backbone with a small percentage of hydrophilic functional groups. The polymeric additives described above can have a relatively hydrophobic character so that the polymeric additive is soluble in molten hydrophobic wax while also being able to bond with hydroxyl groups on both the cellulosic surface as well as the edges of the nanoparticles to provide compatibilization between the materials. This can allow for good dispersion of the nanoparticles in the wax composition. The combination of the well dispersed nanoparticles and compatibilizing polymer can significantly enhance the water barrier properties of the wax coating and also make the wax coating harder, which in turn enhances the rigidity and load bearing strength of products coated with the wax composition.

In contrast to some conventional methods for incorporating an inorganic filler into a wax or polymer matrix, the amount of nanoclay incorporated into the wax composition can correspond to a reduced or minimized amount. For example, the amount of nanoclay incorporated into the wax composition can be from about 0.001 wt % to about 0.5 wt % based on the weight of the wax composition, or about 0.005 wt % to about 0.5 wt %, or about 0.01 wt % to about 0.5 wt %, or about 0.025 wt % to about 0.5 wt %, or about 0.001 wt % to about 0.25 wt % based on the weight of the wax composition, or about 0.005 wt % to about 0.25 wt %, or about 0.01 wt % to about 0.25 wt %, or about 0.025 wt % to about 0.25 wt %, or about 0.001 wt % to about 0.1 wt % based on the weight of the wax composition, or about 0.005 wt % to about 0.1 wt %, or about 0.01 wt % to about 0.1 wt %, or about 0.025 wt % to about 0.1 wt %.

The plate-like inorganic nanoparticles can be composed of various materials. One suitable type of inorganic material is a nanoclay material. Suitable clays can include phyllosilicate clays, such as mica and smectite clays. Exemplary smectite clays include montmorillonite, hectorite, saponite, sauconite, beidellite, nontronite and synthetic smectites such as Laponite™. Graphite nanoparticles are another example of nanoparticles that can have an appropriate aspect ratio for use in enhancing the properties of a wax composition. Plate-like nanoparticles are defined as having an aspect ratio of at least about 25:1, or at least about 100:1. The aspect ratio refers to a diameter of the plate-like surface of the nanoparticle relative to thickness of an edge surface of the nanoparticle.

For aspects involving clay nanoparticles, or other nanoparticles with hydrophilic surfaces, the clay nanoparticles can be modified by adding a polymer to the clay surface to impart hydrophobic character to the clay. A variety of methods can be used to increase the hydrophobic character of a nanoclay. For example, after dispersing a clay in water to form a slurry, a nonionic polymeric hydrotrope can be added to the clay slurry. The amount of hydrotrope added to the slurry can be, for example, from about 1 weight percent to about 10 weight percent relative to the weight of the clay. The hydrotropes may be low-molecular-weight water-soluble polymers, polymers having limited water solubility, or mixtures thereof. The molecular weights can typically be less than 10,000, such as less than 5,000.

Examples of low-molecular-weight water-soluble polymers that are suitable hydrotropes for use in the present disclosure include, without limitation, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, and mixtures thereof.

Nonlimiting examples of polymers with low-water solubility that can be used as hydrotropes in the present disclosure include polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

Optionally, ion exchange reactions with cationic surfactants can also be performed on the clay nanoparticles. Cationic surfactant modifying agents include amine salt-type, phosphonium salt-type, and sulfonium salt-type surfactants. Typically, the modifying agent is a quaternary ammonium salt. Such salts, which are well known in the art, include: dimethyl benzyl hydrogenated tallow ammonium, dimethyl benzyl octadecyl ammonium, methyl benzyl dihydrogenated tallow ammonium, dimethyl dihydrogenated tallow ammonium, trimethyl hydrogenated tallow ammonium, trimethyl octadecyl ammonium, dimethyl didodecyl ammonium, methyl trioctadecyl ammonium, dimethyl dioctadecyl ammonium, methyl tallow bis-2-hydroxyethyl ammonium, dimethyl dicoco ammonium, methyl dibenzyl coco ammonium, dibenzyl dicoco ammonium, tribenzyl coco ammonium, and mixtures thereof. In one aspect, the polymeric hydrotropes can be adsorbed onto the clay prior to adsorbing a cationic surfactant onto the surface of the clay. Alternatively, the clays may be exposed to a dispersion or mixture containing both the polymeric hydrotrope and the cationic surfactant such that hydrotrope absorption occurs substantially simultaneously with ion exchange. In this latter case, elevated temperatures can be used to speed the ion exchange process.

The components of the wax formulation can be combined through various different processes. For example, one way to make the wax (coating) composition can be by dispersing the organically modified nanoclay particles in molten wax and stirring at high speeds to enhance wetting of the clay platelets by wax. A polymer additive as described above can then be added to this suspension and the sample can be stirred at high speeds at temperatures that are at least about 10° C. to about 20° C. above the melt point of the polymer. The stirring can be performed for a sufficient time to fully dissolve the polymer and/or until the nanoclay particulates are seen to be fully dispersed and suspended in the molten wax at rest. In another aspect, the molten wax formulation can be further agitated with a high shear mixing equipment like a homogenizer that further allows for the clay platelets to be exfoliated, which in some instance can lead to improved performance of the coating. In still another aspect, the clay nanoparticles can be melt blended with the polymer additive during an extrusion process. The clay/polymer system can then be added to the molten wax and stirred at high speeds at temperatures that are at least about 10° C. to about 20° C. above the melt point of the polymer, which can then again be followed by high shear blending of the system. In yet another aspect, an option for making the wax (coating) composition can be to melt and homogenize the wax by stirring and heating it in a vessel at a temperature at least about 10° C. above the melting temperature of the wax. The polymer additive can then be blended into the wax at a temperature that is at least about 5° C. to about 20° C. above the melt temperature of the polymer, together with continuous stirring for sufficient time to fully dissolve the polymer in the molten wax at rest. Optionally, if it is desired to incorporate nanoclay particles into the wax composition, the nanoclay particles can be added to the wax composition containing the wax and polymer additive, and then stirred at a sufficient speed to disperse and incorporate the nanoclay particles.

Examples 1-15

Variations in Functionalization of Polymers

Examples 1-15 show the impact of polymer additives on the properties of a wax (coating) composition and how the properties can vary based on the amount of functionalization of the polymers. The amount of functionalization refers to the wt % of functional groups used to modify the base polymer type.

In examples 1-15, the same base wax was used to form wax compositions containing various functionalized polymers as polymer additives. The wax corresponds to a commercially available paraffin wax that includes about 2 wt % oil in wax. The wax composition in Example 1 corresponds to the base paraffin wax without any polymer additives.

The base polymer additive was a polyethylene polymer. The polyethylene without any functional modification was added to the wax to form the wax composition in Example 2. For Examples 3-15, various amounts and/or types of functionalization were incorporated into the polymer additive. Some of the functional groups, such as maleic anhydride were added by grafting. Other functional groups, such as ethylene acrylic acid and ethylene vinyl acetate, were added by co-polymerization. The weight percent of the functional groups relative to the weight of the polymer for each example is shown in Table 1. As shown in Table 1, the amount of functionalization varies from 0.5 wt % of the polymer to over 30 wt %. The amount of polymer additive in Table 1 was held constant at 2 wt %, with the exception of Example 1 which did not include a polymer additive.

TABLE 1

Wax-Polymer Compositions

| Wax Code | Polymer Type | Polymer Conc % | % Functional Group Modification | % Wet Strength | % err |
|---|---|---|---|---|---|
| Wax 1 | None | 9 | NA | 12.0% | 0.6% |
| Wax 2 | PE homopolymer | 2 | 0 | 20.7% | 2.9% |
| Wax 3 | PE-g-MA | 2 | 0.5 | 43.8% | 4.1% |

TABLE 1-continued

Wax-Polymer Compositions

| Wax Code | Polymer Type | Polymer Conc % | % Functional Group Modification | % Wet Strength | % err |
|---|---|---|---|---|---|
| Wax 4 | PE-g-MA | 2 | 3.5 | 41.8% | 4.6% |
| Wax 5 | 1% EAA + 1% PE-g-MA | 2 | 2.75 | 41.1% | 5.0% |
| Wax 6 | EAA | 2 | 5 | 39.2% | 7.1% |
| Wax 7 | EAA | 2 | 10 | 21.4% | 1.7% |
| Wax 8 | EAA | 2 | 15 | 21.8% | 1.8% |
| Wax 9 | EVA | 2 | 6 | 28.9% | 3.0% |
| Wax 10 | EVA | 2 | 13 | 14.1% | 2.1% |
| Wax 11 | EVA | 2 | 18.5 | 14.5% | 3.1% |
| Wax 12 | EVA | 2 | 18.5 | 19.8% | 1.7% |
| Wax 13 | EVA | 2 | 26 | 17.7% | 1.5% |
| Wax 14 | EVA | 2 | 27.6 | 15.5% | 1.0% |
| Wax 15 | EVA | 2 | 31.4 | 21.1% | 1.6% |

For Example 1 (Wax 1) in Table 1, no polymer was added to wax coating. The "PE homopolymer" in Example 2 (Wax 2) is a low density polyethylene homopolymer. This low density polyethylene homopolymer also served as the backbone used for modification by other functional groups in Examples 3-15. For Examples 3 and 4, "PE-g-MA" refers to a polyethylene grafted maleic anhydride copolymer. For Example 5, the polymer added to the wax was a mixture of 1 wt % ethylene acrylic acid copolymer+1 wt % polyethylene grafted maleic anhydride to produce the total 2% of polymer addition. It is noted that the amount of functional group modification for the ethylene acrylic acid copolymer was 5%, while the functional group modification for the polyethylene grafted maleic anhydride was 0.5%. The 2.75% functional group modification listed in Example 5 represent the average for the two polymer additives. For Examples 6-8, "EAA" refers to ethylene acrylic acid copolymer. For Examples 9-15, "EVA" refers to ethylene vinyl acetate copolymer.

FIG. 1 shows the resulting wet strength of cardboard samples coated with the wax compositions of Examples 2-15. When no polymer additive is included (Example 1), the wet strength of the wax coated cardboard is less than 13% of the strength of the original uncoated cardboard. The wet strength of the wax coated cardboard improves to about 20% with addition of 2 wt % of the base polyethylene polymer to the wax composition (Example 2). The polymers with functionalization of greater than about 6 wt % shown in Examples 7, 8, and 10-15 also show a wet strength of about 20%. Unexpectedly, use of a reduced or minimized amount of functionalization provides a substantial additional benefit for the wet strength of the coated cardboard. At functionalization amounts between about 0.5 wt % of the polymer weight to about 5 wt % (Examples 3-6 and 8), the wet strength of the coated cardboard increases to 30% or greater. Even at 6 wt % functionalization as shown in Example 9, the coated cardboard showed a wet strength of just less than 30%. Thus, as shown in Examples 3-6, 8, and 9, use of a controlled amount of functionalization for a polymer additive can allow for a 50% improvement in the wet strength of a coated cardboard sample relative to addition of a polymer without functionalization and/or relative to a polymer with a large amount of functionalization.

Examples 16-20

Variations in Polymer Content

In Examples 16-20, another type of base paraffin wax was used to determine the impact of increasing polymer additive content on the properties of a wax composition. Example 16 corresponds to a wax composition containing the base paraffin wax without a polymer additive. In Examples 17-20, a polyethylene base polymer with 0.5 wt % of grafted maleic anhydride was incorporated into the wax composition. The amount of polymer additive was 2 wt % in Example 17, 3 wt % in Example 18, 4 wt % in Example 19, and 5 wt % in Example 20.

Figure 2:
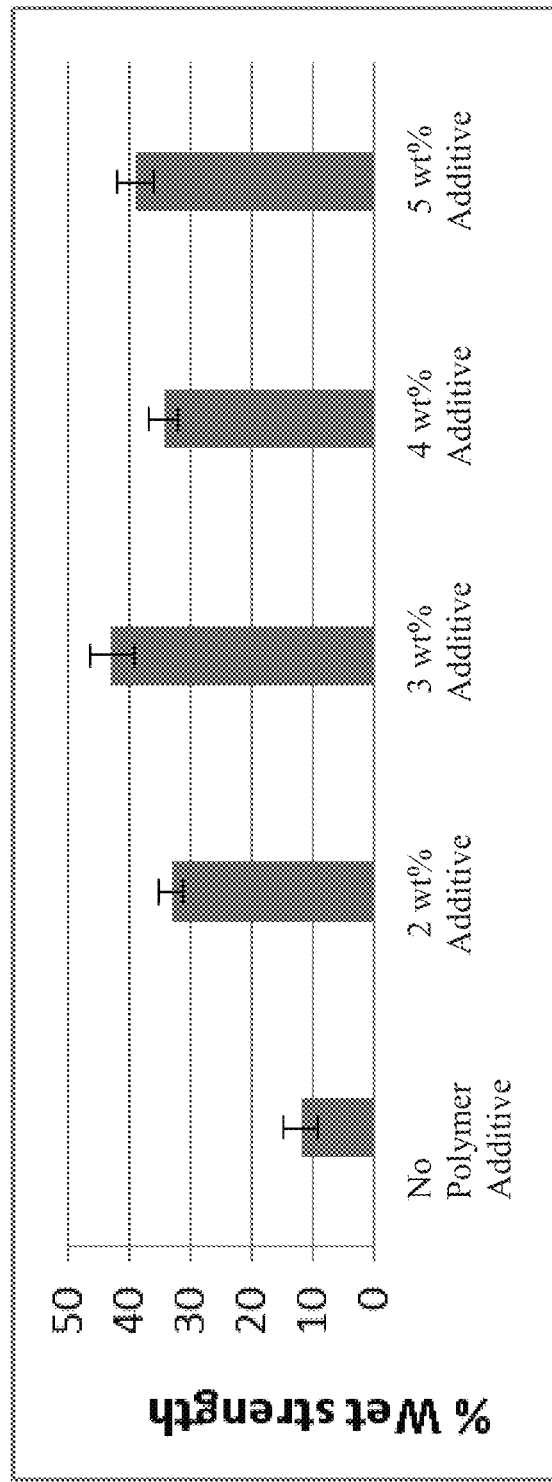
FIG. 2 shows the wet strength for cellulosic samples coated with various wax compositions.

FIG. 2 shows the wet strength a cardboard sample coated with the wax compositions of Examples 16-20. Similar to Example 1, coating a cardboard sample with a base paraffin wax without polymer additive resulted in a wet strength of about 12% in Example 16. Including 2 wt % of polymer additive in Example 17 resulted in a wet strength of greater than about 30%. Increasing the polymer additive content to 3 wt % in Example 18 further increased the wet strength to greater than 40%. However, further addition of polymer additive in Examples 19 and 20 led to only comparable wet strengths to those in Examples 17 and 18. This demonstrates that a substantial portion of the benefit of adding polymer to a wax composition can be achieved by addition of 3 wt % or less of polymer additive.

Figure 3:
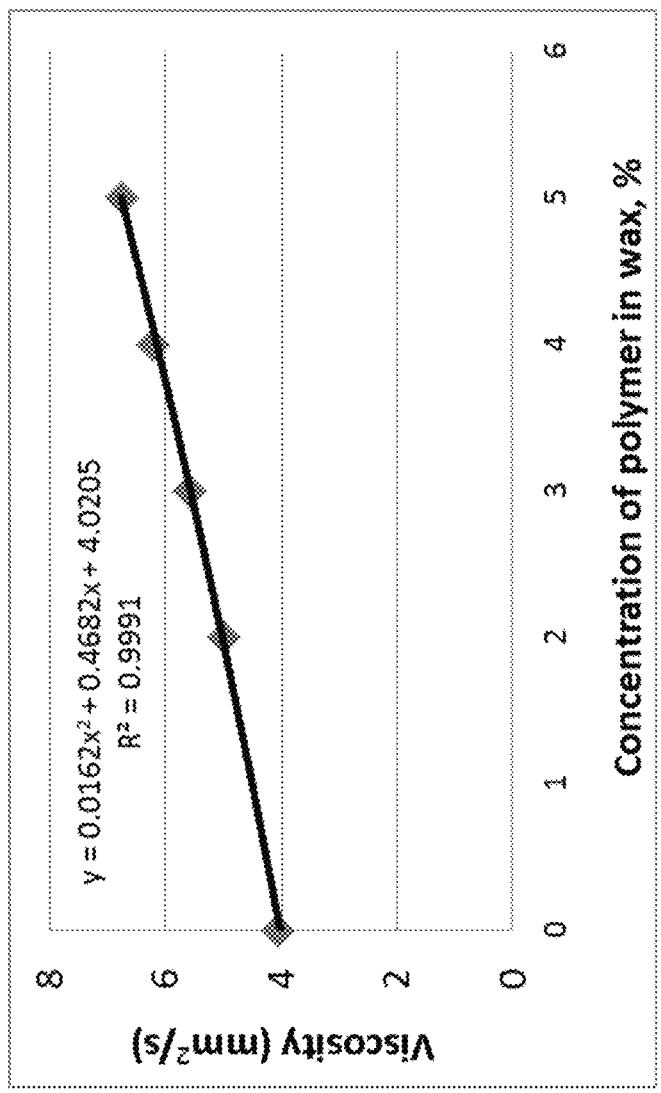
FIG. 3 shows the viscosity as a function of polymer concentration for various wax compositions.

FIG. 3 shows the variation in viscosity for the wax compositions in Examples 16-20. As shown in FIG. 3, the viscosity of the wax composition increases as the amount of polymer additive in the wax composition. Increasing the viscosity of a wax composition can lead to difficulties in applying the wax composition to a paper surface, as an increased layer thickness may be required in order to achieve a continuous coating. The increased layer thickness also corresponds to a more costly coating.

It is noted that the increase in viscosity with increasing polymer additive concentration appears to be roughly proportional in FIG. 3. However, this is believed to be a reflection of the small differences in polymer additive content between the wax compositions shown in FIG. 3. The expected behavior is for the viscosity to increase in proportion to the square of the polymer additive concentration, according to the relationship $$\frac{\mu - \mu_0}{\mu_0} = [\mu]C + kC^2 \quad (1)$$

where $\mu$ is the viscosity of the wax plus polymer additive composition, $\mu_0$ is the viscosity of the wax, $[\mu]$ is the intrinsic viscosity, C is the concentration of the polymer additive, and k is a constant that can be determined by curve fitting. The polynomial fit to this expected functional form is shown in FIG. 3.

Examples 21-26

Addition of Nanoparticles

Examples 21-26 show the impact of addition of inorganic nanoparticles to a wax composition. The base wax (Example 21) is similar to the base paraffin wax used in Example 1. The polymer additive is a polyethylene with 0.5 wt % of grafted maleic anhydride. Example 22 corresponds to the base paraffin wax with 2 wt % of the polymer additive. In Examples 23 to 26, the wax compositions further include either 0.01 wt % or 0.03 wt % of clay nanoparticles. The clay nanoparticles are polymer modified to have increased hydrophobic character, as described above. Table 2 provides a description of the wax composition for Examples 21-26, along with corresponding viscosities for the wax compositions and the wet strength of cardboard treated with the wax compositions. Note that in Table 2, the polymer type "PE-g-MA" refers to polyethylene grafted maleic anhydride.

TABLE 2

Impact of Nanoparticles on Wax Composition Properties

| Example | Polymer Type | Polymer Concentration % | Nanoparticle Concentration % | % wet strength | % err | Viscosity @ 100 C. (mm²/s) |
|---|---|---|---|---|---|---|
| 21 | | 0 | 0 | 9.9% | 1.8% | 3.7 |
| 22 | PE-g-MA | 2.00 | 0 | 39.9% | 5.0% | 4.54 |
| 23 | PE-g-MA | 1.99 | 0.01 | 54.3% | 4.6% | |
| 24 | PE-g-MA | 1.99 | 0.01 | 54.4% | 4.7% | 4.53 |
| 25 | PE-g-MA | 2 | 0.01 | 50.3% | 4.5% | 4.54 |
| 26 | PE-g-MA | 2 | 0.03 | 61.3% | 3.3% | 4.58 |

Figure 4:
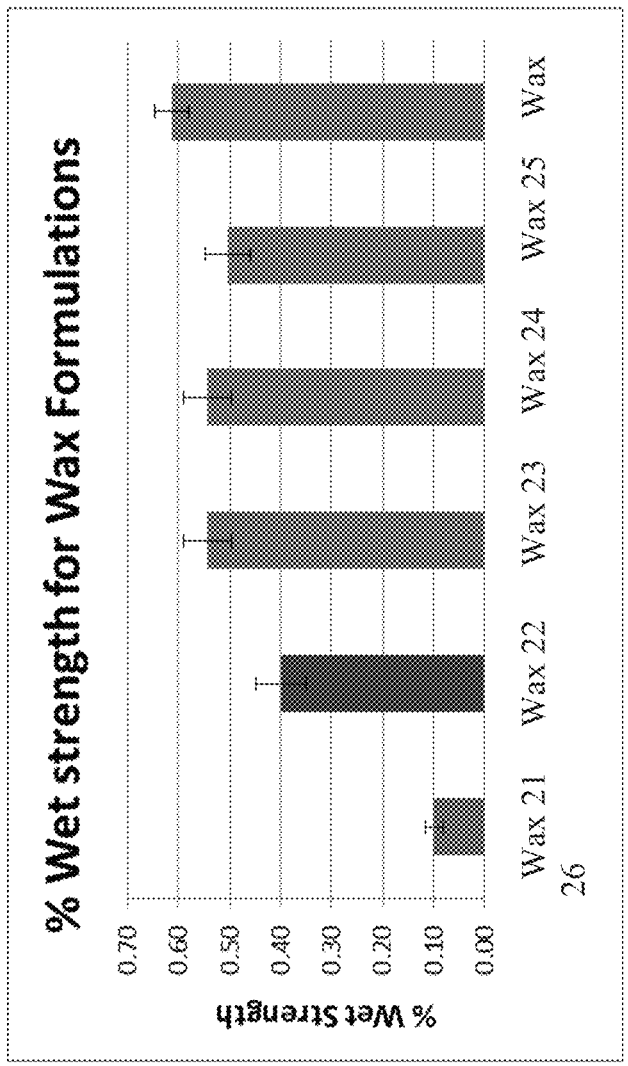
FIG. 4 shows the wet strength for cellulosic samples coated with various wax compositions.

As shown in Table 2, addition of the nanoparticles does not result in a substantial change in the viscosity of the wax composition. However, the wet strength of the resulting coated cardboard increases to greater than 50%. The wet strength for the cardboard samples coated with the various wax compositions is shown graphically in FIG. 4. Even though the amount of nanoparticles incorporated into Examples 23-26 represented less than 0.05 wt % of the wax composition, a substantial additional increase in wet strength was observed.

Additional Embodiments

Embodiment 1

A wax composition, comprising: a wax having a base wax viscosity of 10 cSt or less at 100° C.; and about 0.5 to about 5 wt % of functionalized polymer, based on the weight of the wax composition, the functionalized polymer comprising about 0.4 wt % to about 6 wt % of polar functional groups based on the weight of the functionalized polymer; wherein a) the polar functional groups comprise, oxazolines, epoxides, glycidyl methacrylates, carboxylic acids, ethylene acrylic acids, vinyl alkanoates, ethylene vinyl acetates, ionic compounds, amines, or combinations thereof, b) the composition further comprises about 0.001 wt % to about 0.5 wt % of inorganic nanoparticles, based on the weight of the wax composition, or c) a combination of a) and b).

Embodiment 2

A wax composition, comprising: a wax having a base wax viscosity of 10 cSt or less at 100° C.; and about 0.5 to about 5 wt % of functionalized polymer, based on the weight of the wax composition, the functionalized polymer comprising about 2 wt % to about 6 wt % of polar functional groups based on the weight of the functionalized polymer, or about 2 wt % to about 4 wt %.

Embodiment 3

The wax composition of Embodiment 2, wherein the polar functional groups comprise maleic anhydrides, oxazolines, epoxides, glycidyl methacrylates, carboxylic acids, ethylene acrylic acids, carboxylic acid derivatives, vinyl alkanoates, ethylene vinyl acetates, acid anhydrides, ionic compounds, amines, or combinations thereof.

Embodiment 4

The wax composition of any of the above embodiments, wherein a viscosity of the wax composition is about 12 cSt or less at 100° C., or about 10 cSt or less, or about 8 cSt or less, the viscosity optionally being at least about 3 cSt.

Embodiment 5

The wax composition of any of the above embodiments, wherein a viscosity of the wax composition at 100° C. is less than about 60% greater than the base wax viscosity at 100° C.

Embodiment 6

The wax composition of any of the above embodiments, wherein the inorganic nanoparticles comprise clay particles or phyllosilicate clay particles.

Embodiment 7

The wax composition of any of the above embodiments, wherein the inorganic nanoparticles comprise surface modified nanoparticles, the surface modified nanoparticles having increased hydrophobic character relative to the inorganic nanoparticles prior to surface modification.

Embodiment 8

The wax composition of Embodiment 7, wherein the surface modified nanoparticles comprise inorganic nanoparticles modified with about 1 wt % to about 10 wt % of a polymer, a surfactant, or a combination thereof, based on the weight of the inorganic nanoparticles.

Embodiment 9

The wax composition of any of the above embodiments, wherein the polar functional groups comprise maleic anhydrides, glycidyl methacrylates, ethylene acrylic acids, vinyl alkanoates, ethylene vinyl acetates, or combinations thereof.

Embodiment 10

The wax composition of any of the above embodiments, wherein the functionalized polymer comprises at least 95 wt % polyethylene, polypropylene, a polymer backbone that is soluble in paraffin wax, or a combination thereof.

Embodiment 11

The wax composition of any of the above embodiments, wherein the wax composition comprises about 0.5 wt % to about 4 wt % of the functionalized polymer.

Embodiment 12

The wax composition of any of the above embodiments, wherein the wax is a mineral wax, a paraffin wax, a microcrystalline wax, a vegetable or animal derived bio-wax, a synthetic wax, a Fischer-Tropsch wax, a polyethylene wax, or a combination thereof.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A wax composition, comprising:
   a wax having a base wax viscosity of 10 cSt or less at 100° C.; and
   0.5 to 5 wt % of functionalized polymer, based on the weight of the wax composition, the functionalized polymer comprising 2 wt % to 6 wt % of polar functional groups based on the weight of the functionalized polymer,
   wherein a viscosity of the wax composition is 12 cSt or less at 100° C.

2. The wax composition of claim 1, wherein the polar functional groups comprise maleic anhydrides, oxazolines, epoxides, glycidyl methacrylates, carboxylic acids, ethylene acrylic acids, carboxylic acid derivatives, vinyl alkanoates, ethylene vinyl acetates, acid anhydrides, ionic compounds, amines, or combinations thereof.

3. The wax composition of claim 1, wherein the polar functional groups comprise maleic anhydrides, glycidyl methacrylates, ethylene acrylic acids, vinyl alkanoates, ethylene vinyl acetates, or combinations thereof.

4. The wax composition of claim 1, wherein the polar functional groups comprise oxazolines, epoxides, glycidyl methacrylates, carboxylic acids, ethylene acrylic acids, carboxylic acid derivatives, vinyl alkanoates, ethylene vinyl acetates, acid anhydrides, or combinations thereof.

5. The wax composition of claim 1, wherein the viscosity of the wax composition at 100° C. is less than 60% greater than the base wax viscosity at 100° C.

6. The wax composition of claim 1, wherein the functionalized polymer comprises a polymer backbone that is soluble in paraffin wax.

7. The wax composition of claim 6, wherein the polymer backbone that is soluble in paraffin wax comprises at least 95 wt % polyethylene, polypropylene, polystyrene, or a combination thereof.

8. A wax composition, comprising:
   a wax having a base wax viscosity of 10 cSt or less at 100° C.;
   0.001 wt % to 0.5 wt % of inorganic nanoparticles, based on the weight of the wax composition; and
   0.5 to 5 wt % of functionalized polymer, based on the weight of the wax composition, the functionalized polymer comprising 0.4 wt % to 6 wt % of polar functional groups based on the weight of the functionalized polymer,
   wherein a viscosity of the wax composition is 12 cSt or less at 100° C.

9. The wax composition of claim 8, wherein the inorganic nanoparticles comprise phyllosilicate clay particles.

10. The wax composition of claim 8, wherein the inorganic nanoparticles comprise surface modified nanoparticles, the surface modified nanoparticles having increased hydrophobic character relative to the inorganic nanoparticles prior to surface modification.

11. The wax composition of claim 10, wherein the surface modified nanoparticles comprise inorganic nanoparticles modified with 1 wt % to 10 wt % of a polymer, a surfactant, or a combination thereof, based on the weight of the inorganic nanoparticles.

12. The wax composition of claim 8, wherein the polar functional groups comprise maleic anhydrides, oxazolines, epoxides, glycidyl methacrylates, carboxylic acids, ethylene acrylic acids, carboxylic acid derivatives, vinyl alkanoates, ethylene vinyl acetates, acid anhydrides, ionic compounds, amines, or combinations thereof.

13. The wax composition of claim 8, wherein the polar functional groups comprise maleic anhydrides, glycidyl methacrylates, ethylene acrylic acids, vinyl alkanoates, ethylene vinyl acetates, or combinations thereof.

14. The wax composition of claim 8, wherein the functionalized polymer comprises 2 wt % to 4 wt % of polar functional groups.

15. The wax composition of claim 8, wherein the functionalized polymer comprises a polymer backbone that is soluble in paraffin wax.

16. The wax composition of claim 15, wherein the polymer backbone that is soluble in paraffin wax comprises at least 95 wt % polyethylene, polypropylene, polystyrene, or a combination thereof.

17. The wax composition of claim 8, wherein the wax composition comprises 0.5 wt % to 4 wt % of the functionalized polymer.

18. The wax composition of claim 8, wherein the wax is a mineral wax, a paraffin wax, a microcrystalline wax, a vegetable or animal derived bio-wax, a synthetic wax, a Fischer-Tropsch wax, a polyethylene wax, or a combination thereof.

19. The wax composition of claim 8, wherein the viscosity of the wax composition at 100° C. is less than 60% greater than the base wax viscosity at 100° C.

20. A wax composition, comprising:
a wax having a base wax viscosity of 10 cSt or less at 100° C.; and
0.5 to 5 wt % of functionalized polymer, based on the weight of the wax composition, the functionalized polymer comprising 0.4 wt % to 6 wt % of polar functional groups based on the weight of the functionalized polymer, a viscosity of the wax composition at 100° C. being less than 60% greater than the base wax viscosity at 100° C.,
wherein the polar functional groups comprise, oxazolines, epoxides, glycidyl methacrylates, carboxylic acids, ethylene acrylic acids, vinyl alkanoates, ethylene vinyl acetates, ionic compounds, amines, or combinations thereof.

* * * * *